Jan. 3, 1956     E. B. WILSON     2,729,206

BALL THROWING DEVICE

Filed June 20, 1952

INVENTOR.
ELIOT B. WILSON
BY
HIS ATTORNEY

United States Patent Office 2,729,206
Patented Jan. 3, 1956

2,729,206

BALL THROWING DEVICE

Eliot B. Wilson, Detroit, Mich.

Application June 20, 1952, Serial No. 294,662

4 Claims. (Cl. 124—1)

This invention relates to a ball throwing device and more particularly to an automatic machine for throwing a multiplicity of balls, one at a time, at predetermined intervals.

Machines of the ball throwing type have heretofore been used and may be found in ball parks, playgrounds, gymnasiums and concessions where the ball is thrown to a batter or catcher for practice or a game of skill. These prior devices have been of the arm swinging design and impact type wherein the ball is put into motion by mechanically moving means or spring loaded devices. Considerable difficulty has been experienced in obtaining uniform control of the ball. Further, the cost of manufacture of such machines has been expensive.

It is among the objects of the present invention to provide a novel means for starting a ball in motion; to provide adjustable means for regulating the speed of ball travel; to provide means for regulating the elevation of ball travel; to provide means for regulating the time interval between successive throws; and to provide an inexpensive construction.

More specifically stated the invention is directed to pneumatic means for frictionally gripping the ball and starting it in motion by rotary movement of the pneumatic means.

Figure 1:
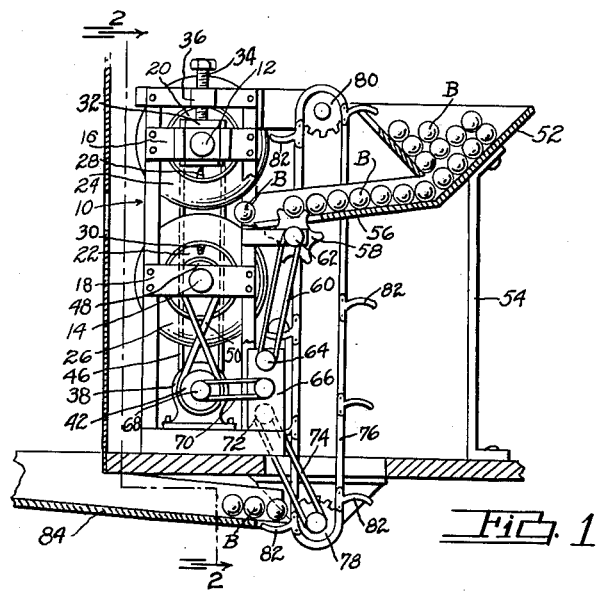
Figure 2:
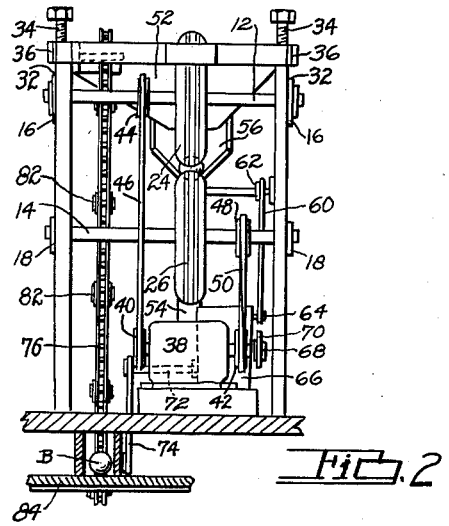

Other objects and advantages of the invention will be more fully understood from the following description taken in connection with the accompanying drawings in which:

Fig. 1 is a side elevational view of my improved device, parts being broken away and in section; and Fig. 2 is a front elevational view, parts thereof being broken away and in section viewed along the line 2—2 of Fig. 1.

Referring to the drawings, I have shown a frame supporting structure 10 in which are rotatably mounted a pair of vertically spaced shafts 12 and 14 in the frame cross plates 16 and 18. Wheels 20 and 22 are carried by the shafts 12 and 14 and each wheel is provided with a pneumatic tire 24 and 26. These tires are similar to an automobile tire and include valve stems 28 and 30. These tires 24 and 26 are so positioned that one is diametrically over the other with their treads adjacent. They may or may not be in contact but are spaced no greater distance apart than the diameter of the ball to be thrown. The upper shaft 12 is mounted in vertically adjustable bearing blocks 32 which are slidably mounted in the plates 16 and 18 and is adjustably positioned by screws 34 in a cross frame member 36. This provides a means for positioning the tire treads relative to each other.

An electric motor 38 is mounted on the base of the frame and its rotatable shaft is provided with pulleys 40 and 42 one at each side of the motor. A pulley 44 is mounted on the shaft 12 and a belt 46 forms a driving connection between the pulleys 40 and 44 for rotating the tire 24 in a clockwise direction, as indicated by the arrow in Fig. 1. A pulley 48 is mounted on the shaft 14 and a belt 50 forms a driving connection between the pulleys 42 and 48 for rotating the tire 26. The belt 50 is crossed so that the tire 26 turns in a counterclockwise direction, as indicated by the arrow.

A hopper 52 is mounted on a support 54 and is adapted to receive a plurality of balls B to be thrown. A downwardly sloping trough 56, at the lower end of the hopper 52, has its lower open end positioned close to the position of the adjacent treads of the tires 24 and 26 so that the balls are fed by gravity between the tire treads substantially on a common tangent line between the tires 24 and 26.

A sprocket wheel 58 and its operating mechanism form a timing device for the passage of balls through the trough to the adjacent surfaces of the tire treads. This sprocket wheel 58 is intermittently rotated through a belt 60 over pulleys 62 and 64. The driving pulley 64 is intermittently rotated through a transmission mechanism 66.

The transmission mechanism 66 includes reduction gears and is driven from pulley 68, on the driving shaft of the motor 38, through belt 70. The transmission mechanism has an output shaft 72 which through belt 74 drives a conveyor belt 76 over sprockets 78 and 80. The belt 76 is provided with outwardly extending forks 82 which pick up the balls, one at a time, and deliver them from a sloping floor 84 to the hopper 52.

The motor 38 drives the tire 24 in a clockwise direction and the tire 26 in a counterclockwise direction. This motor 38, through transmission 66, drives the conveyor belt 76 in a clockwise direction and intermittently turns the sprocket wheel 58 in a counterclockwise direction.

The balls are fed to the approaching surfaces of the tires 24 and 26 where each ball, at predetermined intervals is frictionally gripped between the tires and thrown at a velocity corresponding to the velocity of tire rotation. By regulating the speed of the motor 38, the velocity of the ball travel may be regulated.

As above described, the tires 24 and 26 are of the pneumatic type, having a valve for admitting pressure or discharging pressure. This permits the operator to adjust the pressure of the tires so that they may be of different or equal pressures.

If one tire is softer than the other, the ball will be thrown in a different path of elevation than when the tires carry the same pressure. Thus, the operator may select the desired arc of ball travel and adjust the pressure in the tires to produce that arc.

While I have herein illustrated and described a preferred embodiment of the invention, it will be understood that various changes, including the size, shape and arrangement of parts, may be made without departing from the spirit of my invention and it is not my intention to limit its scope other than by the terms of the appended claims.

I claim:

1. A ball throwing machine comprising a frame, a pair of pneumatic tires rotatably driven in said frame, valve means for varying the air pressure in said pneumatic tires, said tires being arranged with their treads adjacent and the sides of the tires in a plane parallel to the diameter of the tires, means for driving said tires in opposite directions of rotation, and means for feeding balls between the approaching tread surfaces of said tires during rotation of said tires.

2. A ball throwing machine comprising a frame, a pair of pneumatic tires rotatably driven in said frame, said tires being arranged with their treads adjacent and the sides of the tires in a plane parallel to the diameter of the tires, means for driving said tires in opposite directions of rotation, and said tires being provided with valves for regulating the pneumatic pressure within said tires.

3. A ball throwing machine comprising a frame, a pair of pneumatic tires rotatably driven in said frame, valve means for varying the air pressure in said pneumatic tires, said tires being arranged with their treads adjacent and the sides of the tires in a plane parallel to the diameter of the tires, one of said tires being mounted for diametrical adjustment relative to the other of said tires for varying the space between the adjacent surfaces of said tires, means for driving said tires in opposite directions of rotation, and means for feeding balls between the approaching tread surfaces of said tires during rotation of said tires.

4. A ball throwing machine comprising, a frame, a pair of annular rotatable driven members in said frame, said members being arranged with their outer peripheral surfaces adjacent and the sides of the rotatable driven members in a plane parallel to the diameter of the members, means for varying the hardness of the outer surfaces of said members, means for driving said members in opposite directions, and means for feeding balls between the approaching surfaces of said members during rotation of said members.

References Cited in the file of this patent

UNITED STATES PATENTS

| | | |
|---|---|---|
| 1,204,468 | Marty | Nov. 14, 1916 |
| 1,707,726 | Jeter | Apr. 2, 1929 |
| 1,821,755 | Jeter | Sept. 1, 1931 |
| 2,566,379 | Strong | Sept. 4, 1951 |
| 2,586,333 | Hoffmeister | Feb. 19, 1952 |